United States Patent [19]

Buhl

[11] 4,381,138
[45] Apr. 26, 1983

[54] ELECTROOPTIC DEVICES

[75] Inventor: Lawrence L. Buhl, New Monmouth, N.J.

[73] Assignee: Bell Telephone Laboratories, Incorporated, Murray Hill, N.J.

[21] Appl. No.: 181,148

[22] Filed: Aug. 25, 1980

[51] Int. Cl.³ .................................................. G02B 5/14
[52] U.S. Cl. ................................ 350/96.14; 350/96.12
[58] Field of Search ............... 350/96.11, 96.12, 96.13, 350/96.14

[56] References Cited

U.S. PATENT DOCUMENTS 3,877,782  4/1975  Kamirow ..................... 350/96.14
4,236,785  12/1980  Papuchon et al. ............ 350/96.13

OTHER PUBLICATIONS

Alferness, "Efficient Waveguide Electro Optic Mode Converter", American Institute of Applied Physics Letters, 36 (7), 4/1980, pp. 513–515.

Primary Examiner—David K. Moore
Attorney, Agent, or Firm—S. Sherman

[57] ABSTRACT

The response, as a function of frequency, of electrooptic mode converters using comb electrodes has been found to include several peaks at frequencies above and below the desired frequency. These spurious peaks appear to be caused by fringing of the electric field which effectively changes the spatial period of the electrode fingers. To prevent this unwanted coupling, channels have been etched between the comb fingers. The result is to confine the electric field to the narrow region between opposing electrode fingers, thereby minimizing the spurious responses. It also serves to reduce the magnitude of the applied voltage required to produce the same field strength.

6 Claims, 5 Drawing Figures

SECTION A-A

ELECTROOPTIC DEVICES

TECHNICAL FIELD

This application relates to electrooptic devices.

BACKGROUND OF THE INVENTION

Recently, electrooptic TE⇌TM mode conversion has been demonstrated in Ti-diffused lithium niobate waveguides. (See, for example, the article by R. C. Alferness entitled "Efficient, Waveguide Electrooptic TE⇌TM Mode Converter/Waveguide Filter" *Applied Physics Letters*, 36, pages 513-515, Apr. 1, 1980.) Because of the large birefringence of lithium niobate, periodic coupling is required to achieve phasematching. This, in turn, makes the converter highly wavelength selective. As a result, such devices can be used as wavelength filters and, filters based upon these principles have been constructed. (See, for example, U.S. Pat. Nos. 3,877,782, and the 4,273,411.

However, it has been found that their response characteristics, as a function of wavelength, include spurious peaks at wavelengths above and below the desired wavelength. Efforts to reduce these extraneous peaks by weighting the coupling along the coupling interval have been partially successful, but significant sidelobes still remain.

SUMMARY OF THE INVENTION

The present invention is based upon the discovery that in electrooptic mode converters using finger electrodes, spurious peaks are caused by fringing of the electric field about the electrode fingers which effectively changes the spatial period of the electrodes. To prevent this, in accordance with the present invention, channels are etched in the electrooptic substrate between the electrode fingers. The result is to confine the electric field to the narrow region between the ends of opposing fingers, thereby minimizing the spurious responses.

It is an added advantage of the invention that it serves to reduce the magnitude of the applied voltage required to produce the same field strength in the electrooptic material.

DETAILED DESCRIPTION

Figure 1:
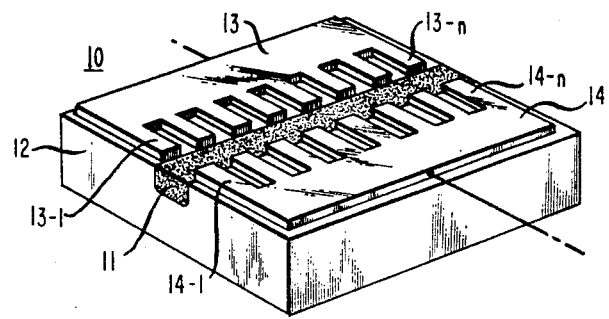
FIG. 1 shows a first embodiment of a mode converter in accordance with the prior art.

Referring to the drawings, FIG. 1 shows a prior art mode converter 10 of the type described in U.S. Pat. No. 3,877,782 comprising a dielectric waveguiding region 11 embedded in an electrooptic substrate 12 of lower refractive index. Periodic coupling between the TE and TM modes of wave propagation is provided by a pair of finger electrodes 13 and 14 disposed along opposite sides of waveguide 11 such that fingers 13-1, 13-2 . . . 13-n of electrode 13 are aligned directly opposite fingers 14-1, 14-2 . . . 14-n of electrode 14.

Figure 2:
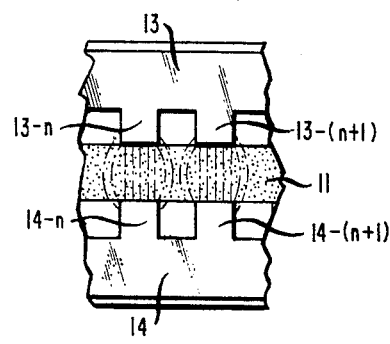
FIG. 2 shows the electric field configuration between the fingers of the electrode shown in FIG. 1.
Figure 3:
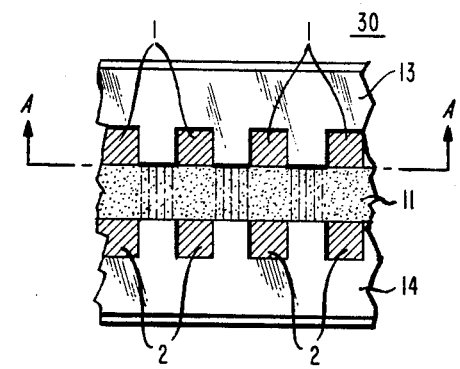
FIG. 3 shows the mode converter of FIG. 1 modified in accordance with the present invention.
Figure 4:
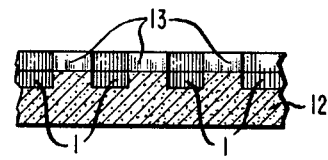
FIG. 4 shows a section A—A of the embodiment of FIG. 3.

As is known, the wavelength at which most efficient mode conversion occurs is a function of the finger-to-finger spacing along waveguide 11. However, if the electric field configuration between opposing electrode fingers is examined, we find that this spacing is poorly defined. This is illustrated in FIG. 2 which shows a portion of the electrodes including fingers 13-1 and 13-2 of electrode 13 and fingers 14-1 and 14-2 of electrode 14, and the lines of electric field which extend between pairs of opposite fingers. As is seen, the fields extend between opposite ends of the fingers and, in addition, bow out from the edges of the fingers. If the separation between finger pairs is increased, as is the case in the weighted electrode, the bowing of the electric field becomes even more pronounced. It is the latter, spurious field components which give rise to the spurious peaks in the mode conversion characteristic of the device. This ambiguity is resolved, in accordance with the present invention, by etching away selected portions of the substrate adjacent to the electrode fingers. This is illustrated in FIG. 3 which shows a portion (30) of the mode converter of FIG. 1 modified so as to restrict the electric field distribution. Specifically, the cross-hatched areas 1, adjacent to the fingers of electrode 13, and the cross-hatched areas 2, adjacent to the fingers of electrode 14, are etched away, or otherwise removed to form recesses in the substrate as illlustrated in a section A—A of the device illustrated in FIG. 4. In this figure, the substrate 12 is shown including the recesses 1 adjacent to the fingers of electrode 13. A similar situation is created with regard to the fingers of electrode 14. The effect is to confine the electric field to the narrow region between opposite fingers as shown in FIG. 3. As is evident, with the field so confined, the spatial periodicity of the electrode structure is more clearly defined, and the spurious responses are reduced.

Figure 5:
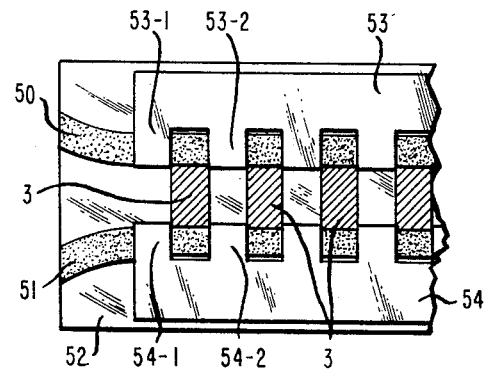
FIG. 5 shows a second embodiment of a mode converter field modified in accordance with the present invention.

A similar technique can be employed in the mode converter filter disclosed in the above-identified Alferness application, as illustrated in FIG. 5. This type of filter (60) comprises a pair of dielectric waveguiding regions 50 and 51 embedded in an electrooptic substrate 52 of lower refractive index. A pair of finger electrodes 53 and 54 are superimposed over the waveguiding regions and may extend into the region therebetween. To avoid fringing of the electric field, the regions bounded by the waveguiding regions and the finger edges are etched away. The regions so bounded are shown cross-hatched in FIG. 5.

A device has been fabricated using a single dielectric waveguide and weighted electrodes. Channels were etched between adjacent fingers of the electrode. Confinement of the electric field was confirmed by the narrower bandwidth response of the device and the absence of spurious efficiency peaks.

I claim:

1. An electrooptic device (30, 60)
at least one optical waveguiding region (11, 50) embedded in a substrate (12, 52) of electrooptic material of lower refractive index;
means for providing periodic regions of electric field within said substrate longitudinally distributed along the length of said waveguiding region including:
a pair of comb electrodes (13-14, 53-54) having fingers (13-1, 13-2 . . . 14-1, 14-2 . . . , 53-1, 53-2 . . . 54-1, 54-2) whose ends are disposed opposite each other along said length;

CHARACTERIZED IN THAT portions (1, 2, 3) of the substrate between adjacent fingers are removed so as to minimize fringing of the electric field between pairs of opposing fingers (13-1, 14-1; 13-2, 14-2 . . . ; 53-1, 54-1; 53-2, 54-2 . . . ).

2. The device according to claim 1 comprising a single waveguiding region (11) wherein said electrodes (13, 14) are aligned along opposite sides of said waveguiding region (11).

3. The device according to claim 2 wherein the portions (1, 2) of said substrate bounded by said fingers (13-1, 13-2 . . . , 14-1, 14-2 . . . ) and said waveguiding region (11) are removed.

4. The device according to claim 1 comprising a pair of coupled waveguiding regions (50, 51) wherein said electrodes (53, 54) are superimposed over said waveguiding regions and extend at least up to the region of substrate therebetween.

5. The device according to claim 4 wherein the portions (3) of substrate bounded by said fingers (53-1, 53-2 . . . 54-1, 54-2 . . . ) and said waveguiding regions (50, 51) are removed.

6. The device according to claim 1 wherein said portions of substrate are removed to a depth of approximately one micron.

* * * * *